United States Patent [19]

Reichard

[11] 4,251,898

[45] Feb. 24, 1981

[54] INTERMITTENTLY OPERATING AIR ACTUATED WINDSHIELD WIPER

[75] Inventor: Robert E. Reichard, Gresham, Oreg.

[73] Assignee: Instrument Sales & Service, Inc., Portland, Oreg.

[21] Appl. No.: 41,094

[22] Filed: May 21, 1979

Related U.S. Application Data

[63] Continuation-in-part of Ser. No. 907,997, May 22, 1978, abandoned.

[51] Int. Cl.³ ............................................... B60S 1/10
[52] U.S. Cl. .............................. 15/250.12; 15/250.16; 91/38; 91/40; 91/219
[58] Field of Search ............. 15/250.12, 250.13, 250.3, 15/250.16; 91/38, 39, 40, 219

[56] References Cited

U.S. PATENT DOCUMENTS

| | | | |
|---|---|---|---|
| 2,987,747 | 6/1961 | Oishei et al. | 15/250.16 |
| 3,301,137 | 1/1967 | D'Alba et al. | 91/219 |
| 3,428,994 | 2/1969 | Bitzer et al. | 15/250.12 |

Primary Examiner—Edward L. Roberts
Attorney, Agent, or Firm—Klarquist, Sparkman, Campbell, Leigh, Hall & Whinston

[57] ABSTRACT

A control valve has a first position in which it directs air under pressure to a wiper motor through a "run" line to actuate the motor to oscillate the wiper. The control valve has a second position in which it directs air through a park line to a valve complex which routes air unidirectionally to the motor to cause the wiper to assume a "park" or rest position. An overriding valve is interposed in the "park" line and is connected to the air pressure source. This valve is of the solenoid type and is intermittently operated by a timer upon its actuation to dispose the overriding valve in a first position in which the flow of "park" air through the override valve is interrupted for a brief period, to allow "run" air pressure to actuate the wiper in normal fashion, and then dispose the valve in a second position in which the "park" air is routed to the motor to temporarily halt the operation of the wiper. This sequence continues so long as the timer remains actuated.

6 Claims, 4 Drawing Figures

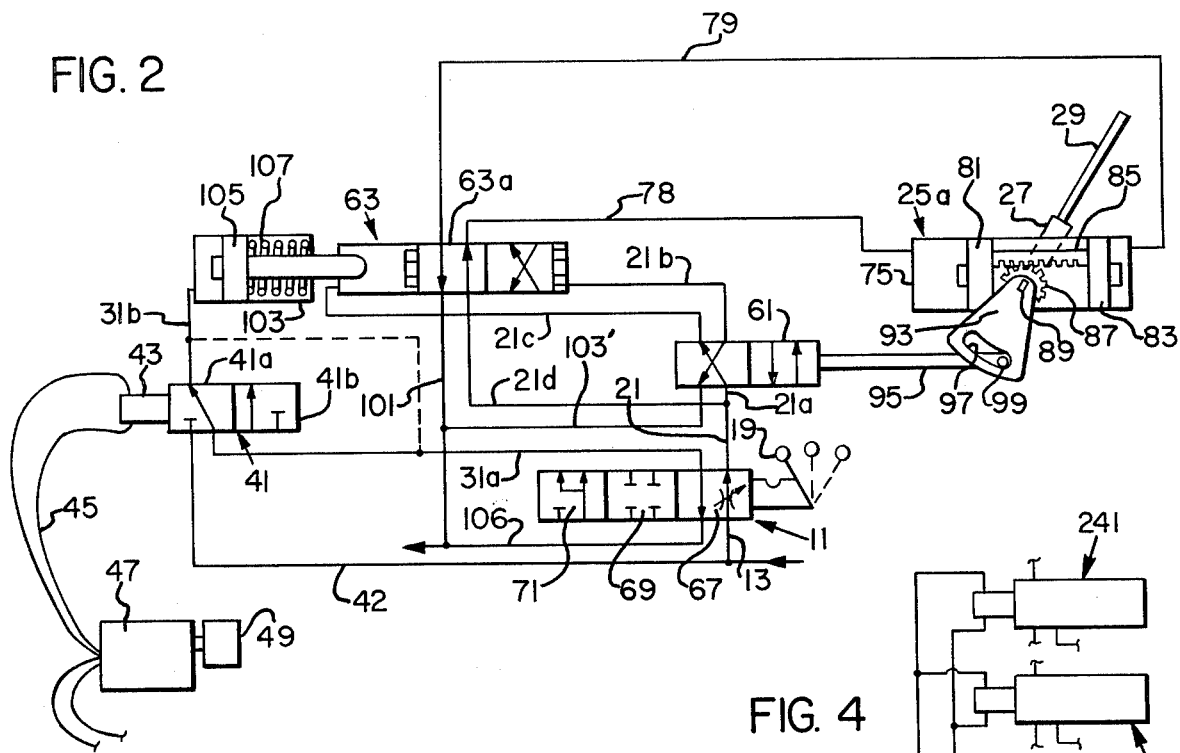
FIG. 2
FIG. 4
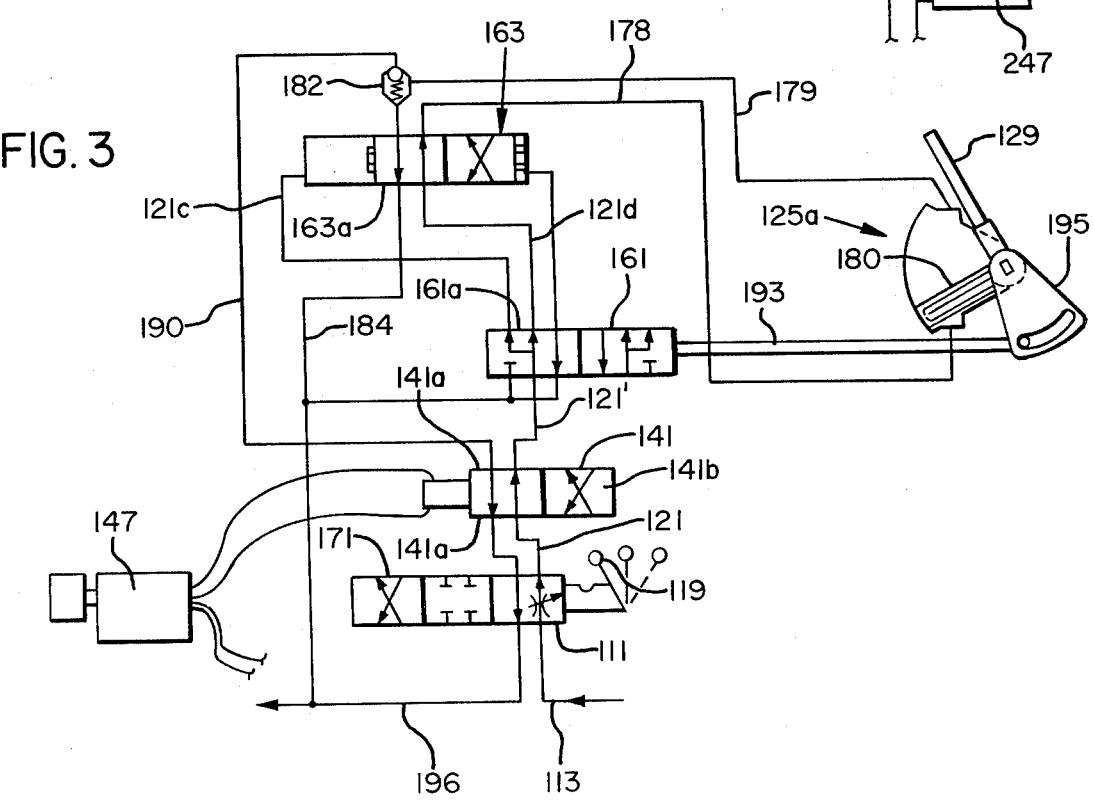
FIG. 3

INTERMITTENTLY OPERATING AIR ACTUATED WINDSHIELD WIPER

BACKGROUND OF THE INVENTION

This is a continuation-in-part of application Ser. No. 907,997, filed May 22, 1978, now abandoned, entitled "Intermittently Operating Air Actuated Windshield Wiper".

Standard truck wiper systems are air pressure operated and comprise two primary components, a control valve and a unitary motor wiper assembly. The latter includes a reciprocating or oscillating wiper motor, a reversing valve interposed in the flow of air to the motor, and a park valve. The reversing valve is mechanically reversed by the piston at the end of each of its strokes, whereby when the control valve is in its "run" position, this arrangement causes continuous reciprocation or oscillation of such piston and thus continuous oscillation of the wiper blade. The "park" valve is utilized to park the blade because the system typically has no automatic park feature. A disadvantage of the standard system is that there is no provision for intermittent blade operation, as is common in many passenger cars.

SUMMARY OF THE INVENTION

The present invention facilitates intermittent operation of the standard truck wiper system, with minimal changes, in fact retaining all the same components, unaltered, but adding a timer controlled solenoid valve so interposed in the system as to accomplish the intended operation. When the control valve is in its "run" position, actuation of the timer controlled solenoid valve will allow "run" air to move the wiper at least one full swipe, then park it for a brief period, and then move it again, and so on. When the solenoid valve is inactive, it leaves the standard system as it was previous to the addition of the valve and its timer.

An object of the present invention is to add a few known and standard components to a present truck system and so incorporate them into the system as to provide for intermittent operation of a single blade, or synchronous intermittent operation of two blades.

A further object is to insert into the standard truck system a timer-valve arrangement which, when "on", causes the standard system to shift back and forth between its "run" and "park" conditions to effect intermittent operation, but when "off" leaves the standard system in exactly the same condition as before.

A still further object is to provide an arrangement wherein all the original components and functions of the standard system are retained, but an additional function—intermittent operation—is facilitated by the added components.

The subject matter which I regard as my invention is particularly pointed out and distinctly claimed in the concluding portion of this specification. The invention, however, both as to organization and method of operation, together with further advantages and objects thereof, may be best understood by reference to the following description, taken in connection with the following drawings, wherein like reference characters refer to like elements.

In the drawings:

FIG. 2 is a diagram of the system of FIG. 1;

FIG. 3 is a diagram of a similar system but incorporating a vane type motor; and FIG. 4 is a fragmentary diagram of a synchronous two blade system.

Figure 1:
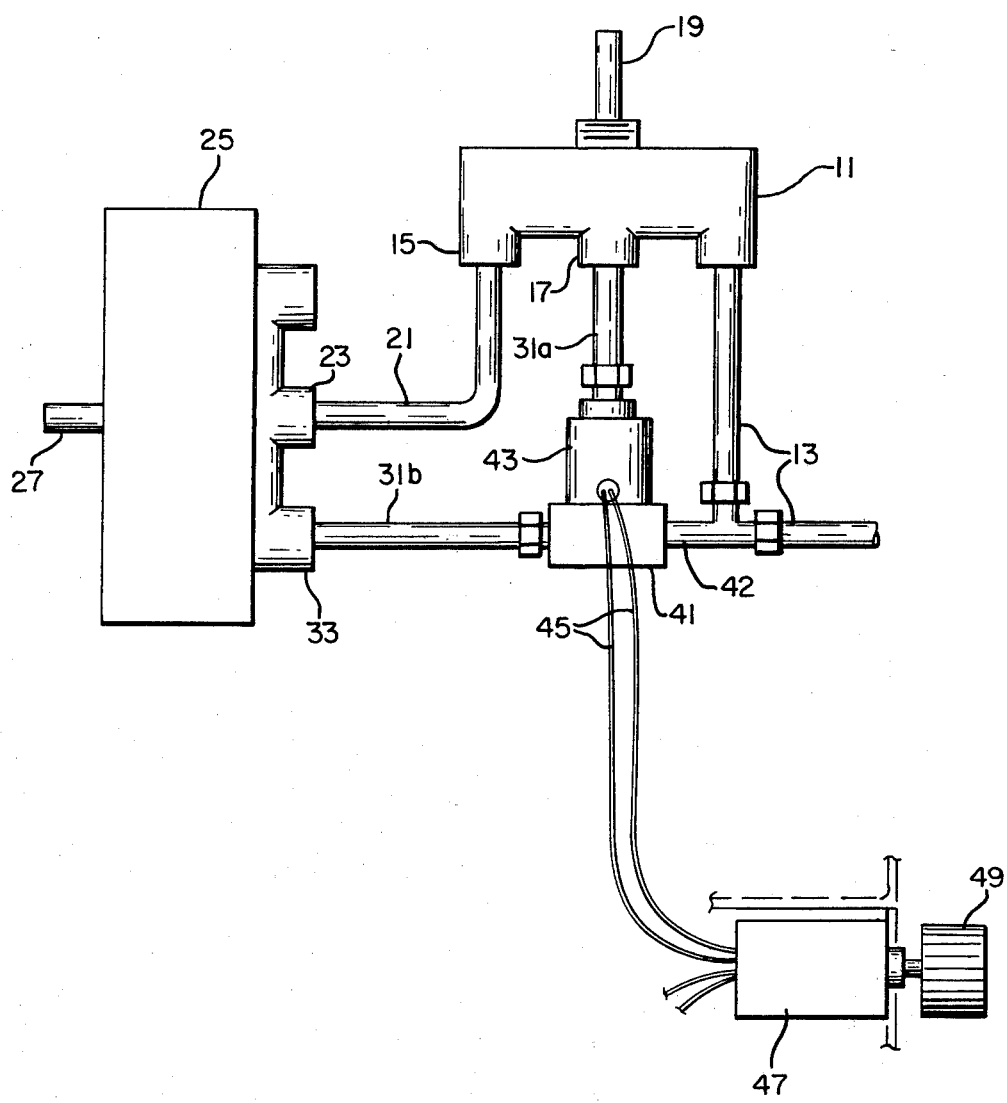
FIG. 1 shows an air operated windshield wiper system of the present invention, having a piston type motor.

Referring to FIG. 1, a control valve 11, of the conventional form, receives air under pressure from a source (not shown) through a supply line 13. The valve has a "run" outlet at 15 and a "park" outlet at 17 and a control knob 19. The knob 19 has three positions, an "off" position, a "run" position and a "park" position. Usually there is a spring to bias the knob to return from "park" to "off" position.

Air from the run outlet is conducted by a line 21 to a run inlet 23 of conventional motor wiper assembly 25, which is shown as having a wiper actuating stem 27 for actuating a wiper blade 29 (FIG. 2). Conventionally, air from the park outlet 17 would be conducted by a line 31a—31b directly to a park inlet 33 of motor assembly 25.

However, I have altered the operation of the conventional system to provide for intermittent operation of the wiper blade by interposing a solenoid control valve 41 in line 31a—31b, and by connecting valve 41 to the air line 13 by a line 42. The solenoid 43 of the solenoid valve is connected by wiring 45 to an electronic modulator or timer 47, which, in and of itself, is of conventional form. The timer can be mounted on the dashboard of the vehicle and has a control knob 49 having an "off" position in which it leaves solenoid 43 deenergized, or in an "on" position in which it intermittently energizes the solenoid to effect intermittent operation of the wiper blade (in a manner to be presently explained). The timer is of the type in which the time periods between energizations can be varied depending on the extent of turning of the knob 49. Thus, the time periods between momentary actuations of the wiper blade can be varied at the will of the operator between, say, two seconds and thirty seconds. In FIG. 2 the valve 41, park cylinder 103 and shuttle valve 63 comprise override means.

The "run" air volume can be adjusted by adjusting knob 19 to vary the time it takes the blade to complete one full cycle of movement. It is contemplated that this adjustment will be made (by the driver) relative to the run period provided by the timer, so that the wiper completes less than one cycle but more than a half cycle of operation.

FIG. 2 better shows the make-up and relation of the parts. The motor assembly 25, in certain standard systems, is a product of the Sprague Company, identified as M55480. As such it includes an air motor 25a, a simple reversing valve 61, and a reversing type shuttle valve 63. The control valve 11 in a typical installation might also comprise a product of the Sprague Company. Its control knob 19 is shown for convenience as having a pivot action. In fact, the knob is turnably mounted for movement from the middle "off" position to a left "run" position, or from the "off" position to a right "park" position. The valve is of the type that when once turned to its "run" position further turning increases the volume of air passing through the valve in proportion to the extent of turning movement. This feature is indicated by the valve element 67 in FIG. 2 and facilitates controlling the speed of the wiper blade. The function of the central "off" element at 69 is obvious. In the "park" position element 71 will route air from air pressure line 13 to both lines 21 and 31a.

Air from line 21 goes to reversing valve 61 through line 21a. Valve 61 functions to alternately route air through lines 21b and 21c to the opposite ends of shuttle valve 63 to normally control the position of the spool of the latter. Air from line 21 is also routed by a line 21d to the spool of valve 63, which functions to alternately route air to the opposite ends of cylinder 75 of the wiper motor 25a by lines 78 and 79.

The motor 25a has a piston comprising spaced twin piston elements 81 and 83 connected by a rack 85. The latter engages a gear segment 87 fixed to a shaft 89, which carries the wiper blade 29. The shaft also carries a cam 93 which has a lost motion connection with a link 95 via an arcuate slot 97 which receives a pin 99 on the link.

Just before the piston of the motor 25a reaches the end of its travel to the right, pin 99 bottoms out to reverse the action of valve 61. The same thing occurs just before the piston reaches its left hand extreme position. FIG. 2 shows the piston just before it reaches its extreme right hand position and thus just before it would actuate the link 95 to reverse the action of valve 61. It is evident that the relationship of motor 25a and valves 61 and 63 is such that when knob 19 is in its "run" position, movement of the piston each way causes a reversal of the flow of air to the motor, whereby to cause continuous oscillation of the blade 29.

Exhaust air is alternately conducted from the motor through lines 78 and 79 to an exhaust line 101, and from the ends of shuttle valve 63 alternately through lines 21b and 21c through valve 61 to an exhaust line 103.

The blade 29 can be stopped by turning the knob 19 to its "off" position, with element 69 in alignment with line 13, but the blade will remain in the position it occupied when the knob was actuated. Typically, the driver will flip the knob to its "park" position to place element 71 in alignment with the line 13 to direct air to lines 21 and 31a. Without the presence of valve 41, air in 31a would pass through line 31b to a park cylinder 103. (With valve 41 in the system, and with timer 47 off, element 41a is aligned with line 31a to direct air the same way). Air to the cylinder 103 would cause plunger 105 of such cylinder to shift from its left hand inactive position to its right hand active position against the resistance of a spring 107. This plunger movement would cause right hand shifting of the spool of valve 63 to bring element 63a into alignment with the line 21d to direct air to the left hand end of cylinder 75. This would drive the piston 81-83 of motor 25a to its extreme right hand position to "park" the blade 19 in its down right hand position.

Note that full right hand movement of the piston 81-83 of motor 25a will act through cam 93 to shift the spool of valve 61 to the left to route air through line 21b to the right hand end of valve 63 urging its spool to shift left. However, the area of the plunger 105 exceeds that of the spool of valve 63 so that such spool remains right despite the air pressure in line 21b.

To cause intermittent operation, the valve 11 must be in its FIG. 2 "run" position. The timer knob 49 is turned from its "off" to its "on" position. This functions to intermittently shift the spool of valve 41 left from its FIG. 2 position, where element 41a is active, to a position with element 41b active. Now air from line 42 is routed to line 31b to actuate plunger 105 to effect parking of the blade 29 for a period of time proportional to the extent that timer knob 49 is turned (say, somewhere between two and thirty seconds, depending on the knob setting). At the end of the period, timer 47 functions to shift valve 41 so as to connect line 31b to 31a instead of 42. Since line 31a is now connected to an exhaust line 106, spring 107 causes plunger 105 to retract. This leaves valve 63 free to function normally, so the wiper motor starts operating. However, before it has completed its full back and forth movement, the timer actuates valve 41 to park the blade. This sequence of intermittent action continues until the timer is turned off.

FIG. 3 shows a system which, apart from the solenoid valve 141 and the timer 147 is a conventional one for operating a vane or paddle wheel motor 125a of a motor assembly, which, typically, could be a Trico APMH615-11. It has a control valve 111 of a type which is basically similar to that of valve 11, in that it is of the rotary type having a control knob 119 movable from a central "off" position to a left "run" position or to a right "park" position. If differs from valve 11 only in that its left hand element 171 has a reversing function instead of the "single in - double out" function of element 71 of valve 11.

The FIG. 3 system is also like FIG. 2 in having a reversing valve 161 connected by a lost-motion-cam device at 193-195 to motor 125a. FIG. 3 also has a shuttle valve 163, however it has no park cylinder 103 like valve 63.

A difference between FIGS. 2 and 3 is in the location of the timer controlled solenoid valve. In order to accomplish intermittent operation, I have found that in FIG. 3 it must be interposed between the control valve 111 and the reversing valve 161, instead of located as in FIG. 2.

In each system, the solenoid valve when in its "straight-through" inactive position, in no way changes the operation of the system in which it is incorporated. Thus in FIG. 3 air from the source line 113 after passing through valve 111 and into line 121, passes through element 141a of valve 141 into a line 121'. Valve element 161a of valve 161 directs such air through a line 121d to shuttle valve 163, and through a line 121c to the left end of such valve. The latter air acts to shift the spool of such valve right (to its FIG. 3 positiion) where "straight-through" element 163a directs air from line 121d to a line 178 which leads to the motor 125a. This air urges the vane 180 clockwise.

Air from the motor 125a exhausts through line 179 past a check valve 182 then through valve element 163a to exhaust line 184. When the vane 180 is driven to its uppermost position, connector 193 will reverse valve 161 which will cause a reverse action of the motor, and so on.

The solenoid valve 141 is controlled by a timer 147 which is identical to timer 47 of FIG. 2. When the timer 147 is actuated, a reversing element 141b comes into play to cause air from 121 to pass into a line 190. This actuates the check valve 182 to close exhaust 184 and supply air to motor 125a to urge the vane 180 down to park the blade 129 left (FIG. 3 position). Line 178 which normally would conduct air to the bottom of the vane, is now connected via valves 163, 161, 141 and 111 to an exhaust line 196.

This condition continues from 2-30 seconds, when the timer deactivates the solenoid valve so that it returns to its FIG. 3 position to drive the blade fully up and part way down, whereupon the timer again energizes the solenoid valve to park the blade left. The continued intermittent action of the timer causes corresponding intermittent action of the wiper blade 129, until the timer is turned off. Thereafter, with control valve in its left "run" position, the blade will continuously oscillate. In FIG. 3 valve 141 and shuttle valve 163 comprise override means.

FIG. 4 shows that my system is ideal for achieving synchronous operation of two wiper blades. The single timer 247 is connected in parallel with two solenoid valves 241 and 241' of two systems like that in FIG. 2. Thus, when timer 247 is actuated, both systems are simultaneously actuated to effect synchronous intermittent operation of the two blades of the systems. The same result would be achieved in vane type motor systems by connecting the timer 147 of FIG. 3 in parallel with the solenoid valve of each of two systems like that in FIG. 3.

What is claimed is:

1. In a windshield wiper system having an air motor for operating a windshield wiper, said air motor having an air actuated member driven in opposite directions, reversing valve means connected to said member to be reversed by said member at the end of the movement in each direction of said member whereby to reverse the direction of supply of air to said air motor and provide for continuous oscillation of the windshield wiper, override means operable when actuated to move said member fully in one direction and hold it there to park said wiper, and timer controlled solenoid valve means for intermittently actuating said override means to provide for periods in each of which said override means is active for a predetermined period of time to park said wiper, alternating with periods in each of which said override means is inactivated to permit said reversing valve to effect oscillation of said wiper, whereby to obtain intermittent operation of said wiper.

2. A system as recited in claim 1 wherein there are control valve means having a "run" position in which air is supplied to said reversing valve means but not to said override means, and a "park" position in which air is supplied to said override means to effect parking of said wiper.

3. A system as set forth in claim 2 in which said timer controlled solenoid valve means is operatively interposed between said control valve means and said override means.

4. A system as recited in claim 3 in which said timer controlled solenoid valve means is also operatively interposed between said control valve means and said reversing valve means.

5. In a windshield wiper system having an air motor for operating a windshield wiper, said air motor having an air actuated member driven in opposite directions, reversing valve means connected to said member to be reversed by said member at the end of each direction of movement of said member whereby to reverse the direction of supply of air to said air motor and provide for continuous oscillation of the windshield wiper, override means operable when actuated to move said member fully in one direction and hold it there to park said wiper, control valve means having a "run" position in which air is supplied to said reversing valve means, and means for effecting intermittent operation of said wiper while said control valve means is in its "run" position.

6. A system as recited in claim 1 wherein there is a second override means for parking a second air motor, said timer controlled solenoid valve means also intermittently actuating said second override means to effect synchronous intermittent operation of said second air motor.

* * * * *